United States Patent [19]
Jacob et al.

[11] Patent Number: 5,651,738
[45] Date of Patent: Jul. 29, 1997

[54] DEVICE FOR CONNECTING A TUBULAR SHAFT TO A JOURNAL

[75] Inventors: Werner Jacob, Frankfurt; Manfred Niederhüfner, Hanau; Matthias Wiemer, Käshofen, all of Germany

[73] Assignee: Löhr & Bromkamp GmbH, Offenbach am Main, Germany

[21] Appl. No.: 454,938

[22] Filed: May 31, 1995

[30] Foreign Application Priority Data

Jun. 3, 1994 [DE] Germany ............... 44 19 372.6

[51] Int. Cl.$^6$ .................. F16C 3/03; F16D 1/02
[52] U.S. Cl. .................. 464/182; 403/370; 464/140; 464/167; 464/906
[58] Field of Search .................. 464/179, 178, 464/182, 140, 141, 139, 168, 167; 403/370, 368, 371

[56] References Cited

U.S. PATENT DOCUMENTS

| | | | |
|---|---|---|---|
| 2,199,926 | 5/1940 | Swennes | 464/162 X |
| 2,573,928 | 11/1951 | Peter | 403/368 X |
| 3,972,635 | 8/1976 | Peter et al. | 403/370 X |
| 4,095,908 | 6/1978 | Schäfer et al. | 403/370 X |
| 4,203,306 | 5/1980 | Sehlbach et al. | 403/370 X |
| 4,464,140 | 8/1984 | Lundgren | 403/370 X |
| 4,475,842 | 10/1984 | Onaya et al. | 403/370 |
| 4,622,022 | 11/1986 | Diffenderfer et al. | 464/183 X |
| 4,781,486 | 11/1988 | Mochizuki | 403/371 X |
| 5,304,012 | 4/1994 | Wendling | |

FOREIGN PATENT DOCUMENTS

| | | |
|---|---|---|
| 0339380A1 | 4/1989 | European Pat. Off. |
| 1720659 | 4/1958 | Germany |
| 2532661B2 | 7/1977 | Germany |
| 3428327C2 | 6/1987 | Germany |
| 4105794A1 | 9/1992 | Germany |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A clamping mechanism (12) connects a tubular shaft (4) to a journal (11). In its bore, the tubular shaft (4) has a profile which is engaged by the journal (11) by a corresponding counter-profile on its outer face along a length of overlap. The profile and counter-profile are tensioned relative to one another by the clamping mechanism (12). The clamping effect is achieved by taking advantage of the possibility of deforming the cross-section of the tube.

15 Claims, 4 Drawing Sheets

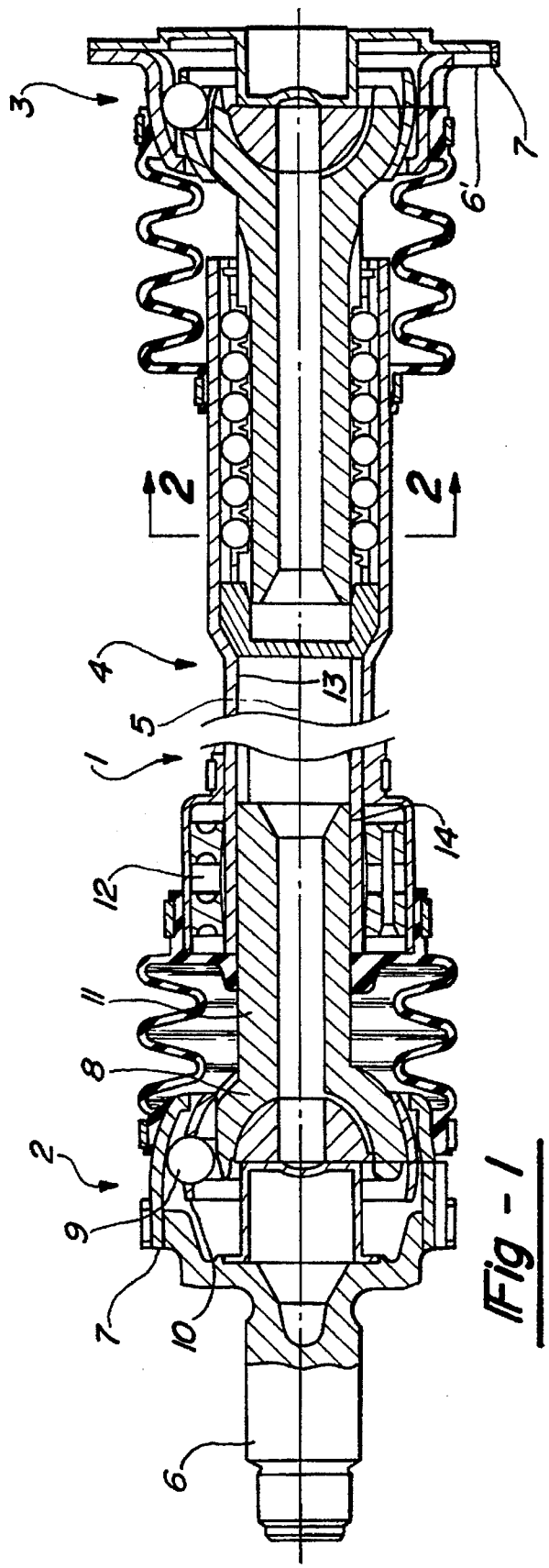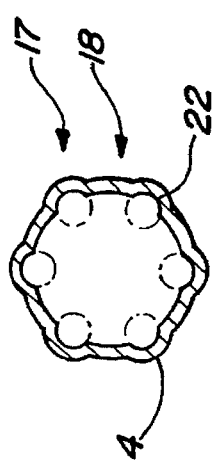

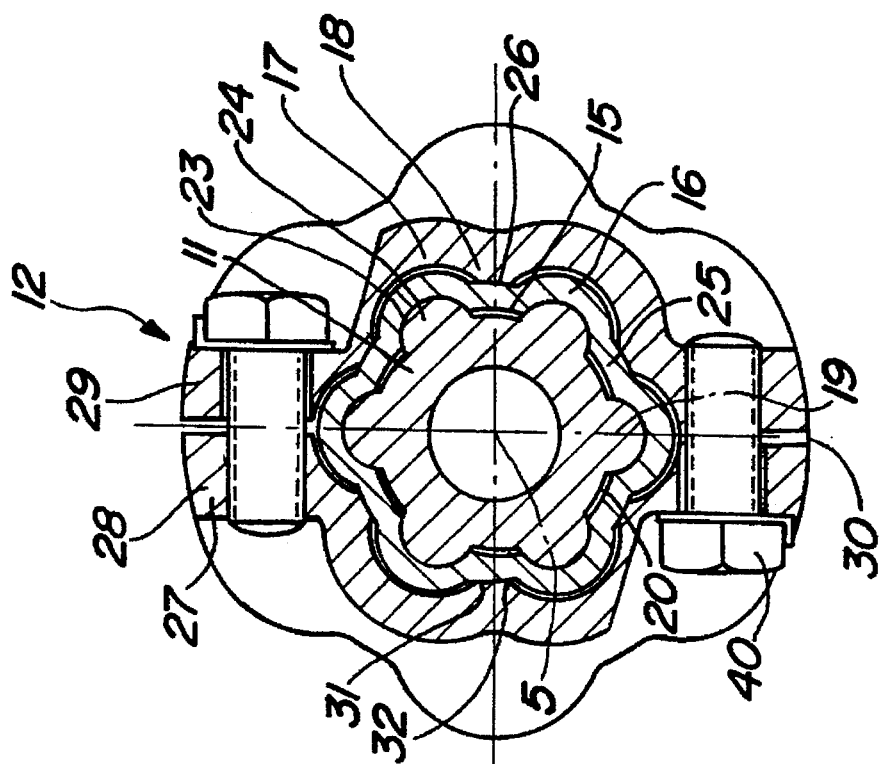
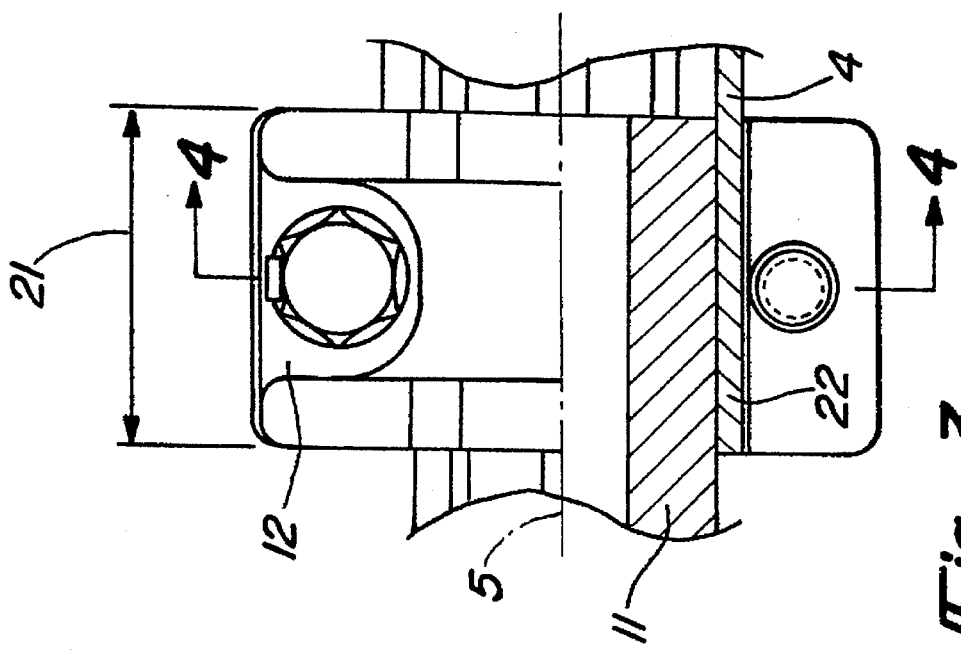

DEVICE FOR CONNECTING A TUBULAR SHAFT TO A JOURNAL

BACKGROUND OF THE INVENTION

The invention relates to a device for connecting a tubular shaft to a journal. The tubular shaft, in its bore, includes a profile which is engaged by the journal by a corresponding counter-profile on the outer face of the journal. Both profiles have a length of overlap and the profile and counter-profile are tensioned relative to one another. Each profile includes circumferentially distributed raised portions and indentations which extend parallel to the longitudinal axis and engage one another.

Such connections are used in driveshafts, for example, to drive the front wheels or rear wheels of a motor vehicle. The connecting shaft is in the form of a tubular shaft and includes serrated teeth into which a journal is pressed with corresponding serrated teeth. The pressing operation takes place under very high pressure forces in order to eliminate all play between the shaft and journal. The serrated teeth used correspond to standardized serrated teeth. However, depending on the tolerances occurring during production, the pressing-in forces scatter considerably.

The disadvantage of such an embodiment is that it requires very high pressing-in force which, in particular, make It very difficult to remove such a driveshaft for repair purposes. For example, such a connection cannot be released for fitting a new convoluted boot in the fitted condition in the vehicle, nor can it be pressed in again after the boot has been fitted. A further disadvantage is that fretting corrosion may occur which greatly complicates the operation of releasing the connection.

SUMMARY OF THE INVENTION

It is an object of the invention to provide a device to connect a tubular shaft to a journal, which is easy to fit, secures the two parts relative to one another, and which is easily released for re-assembly purposes.

In accordance with the invention, the objective is achieved by forming the profile of the tubular shaft in a tube wall of the tubular shaft. The tube wall extends at least along the length of overlap and is provided with a corrugated cross-section. The tubular shaft is tensioned relative to the journal by a clamping mechanism. The clamping mechanism acts on the outer face of the tubular shaft in the region of the length of overlap of its profile relative to the counter-profile.

An advantage of such an embodiment is that assembly takes place in a force-free way. Also, the subsequent tensioning operation is easy to effect. The forces required are low. The tensioning means used do not only effect axial fastening, but also ensure there is no play. Furthermore, the connection is easy to release, so that at a later date, the dismantling operation, for instance for the purpose of replacing a joint or simply a boot, can be carried out without complications.

According to a further embodiment of the invention, the indentations of the profile of the tubular shaft and the raised portions of the counter-profile of the journal contact one another linearly at their flanks in the untensioned condition.

The advantage of such a measure is that because of the linear contact, the assembly forces can be kept low. The clamping means effect tensioning in such a way as to convert the linear contact into an area contact. For this purpose it is proposed, according to a first embodiment, that a gap is provided between the inwardly directed raised portions of the profile, which are formed by the corrugated shape of the tubular shaft, and the indentations of the counter-profile of the journals. Also, the clamping means apply a force to the base area of the outer corrugation valleys. The valleys are formed on the outer face of the tubular shaft and are positioned between two indentations of the profile.

The tensioning forces, by acting on the base area of the corrugation valleys, effect deformation. The wall of the tubular shaft, by means of its profile, rests closely against the counter-profile of the journal, to achieve an area contact.

According to a first embodiment, the clamping means is formed by a flange divided into two flange halves. The dividing plane contains the longitudinal axis and the flange halves are tensioned relative to one another. The flange encloses the tubular shaft. The flange, on its inner contour enclosing the tubular shaft, includes projections with supporting faces which may be pressed against the base areas of the corrugation valleys.

The clamping forces are preferably generated by clamping means. The coupling means includes one or several clamping elements with supporting faces resting against the base areas of the outer corrugation valleys of the tubular shaft. The tensioning elements act radially inwardly towards the longitudinal axis on the clamping elements.

According to a first embodiment, a clamping element is in the form of a slotted sleeve. The clamping element includes inwardly directed projections provided with supporting faces and which is positioned on the tubular shaft. The clamping element, on its outer face, has two conical faces in the form of tensioning faces extending in opposite directions. A tensioning ring, with a corresponding conical bore, is slid onto each of the tensioning faces. The tensioning rings are tensioned relative to one another, thus generating radially directed tensioning forces.

Alternatively, a plurality of clamping elements are provided. Each clamping element includes a supporting face and each element is arranged in a corrugation valley. All clamping elements, on their outer faces, are provided with partially conical faces, which constitute tensioning faces, which complement one another in that, together, they form conical faces. Two tensioning rings are provided, each with a conical bore and each slid onto the tensioning faces. The rings are tensioned relative to one another to achieve the tensioning force.

The tensioning rings are tensioned relative to one another by bolts or tie rods. The tie rod may be a piece of wire or round material which axially extends through bores of the tensioning rings. The rod is angled at its ends so that the angled ends contact the faces of the two tensioning rings facing away from one another. Alternatively, it is possible to use hollow rivets for tensioning purposes. Thus, the tensioning pliers used for applying the rivets may also be used to tighten the tensioning rings.

Furthermore, the clamping means may have one or several clamping elements which are supported against the flanks of two adjoining outer corrugation peaks of the tubular shaft.

It is particularly advantageous to use the device in accordance with the invention in a driveshaft which includes two constant velocity joints. Each joint has an outer part, an inner part, and a connecting shaft which connects the two inner parts. The device serves to connect at least one of the inner parts, which includes a journal, to the connecting shaft which is in the form of a tubular shaft. The tubular nature of the shaft and the corrugated connection ensure that the masses to be accelerated are as small as possible. By providing the tubular shaft with a corrugated shape, it is possible to increase its strength and to improve the vibration behavior.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 is a sectional view of a shaft with constant velocity joints, including the connection device in accordance with the invention.

FIG. 2 is a cross-section view along line 2—2 of FIG. 1.

FIG. 3 is a partial longitudinal section view through a first embodiment of a connecting device with two flange halves.

FIG. 4 is a section view along line 4—4 of FIG. 3.

DETAILED DESCRIPTION OF THE DRAWINGS

Figure 5:
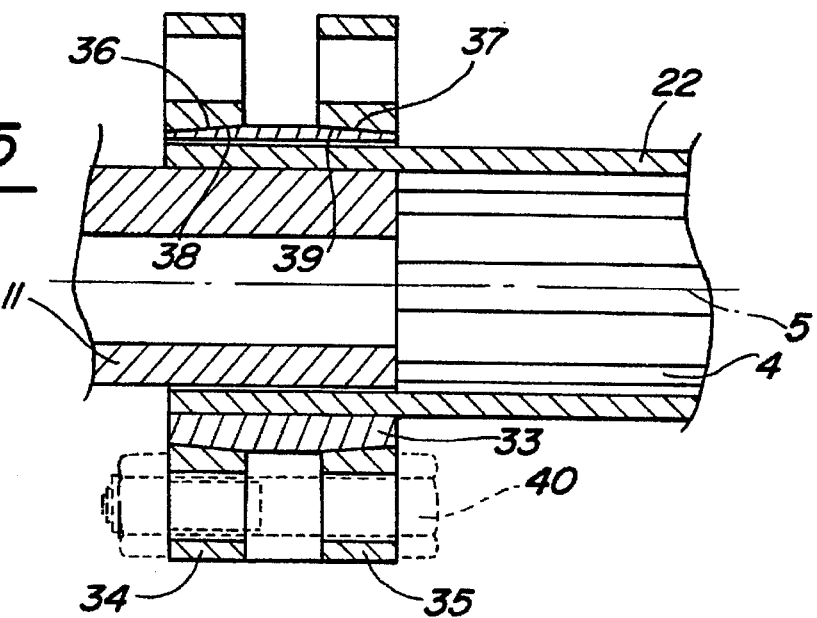
FIG. 5 is a second embodiment of a longitudinal section view along line 5—5 of FIG. 6 through an embodiment having a slotted sleeve slid onto the tubular shaft.

FIG. 1 shows a driveshaft 1 with constant velocity joints. The driveshaft serves, for example, to transmit torque between a front or rear axle differential of a motor vehicle to the associated front or rear wheel. The driveshaft 1 includes two constant velocity joints 2, 3 which are connected to one another by a connecting shaft 4. The connecting shaft 4 is in the form of a tubular shaft. The driveshaft 1 is shown in its extended condition so that its components include the same longitudinal axis 5.

The two constant velocity joints 2, 3 are connected to the driveline by connecting means 6. The connecting means 6 for the constant velocity joint 2 is in the form of a plug-in journal with teeth and in the form of a flange for the constant velocity joint 3. For example, the journal 6 serves to provide a connection with the wheel hub of a front or rear wheel. The flange 6' of the constant velocity joint 3 serves to establish a connection with the output end of the front or rear axle differential. The constant velocity joint 2 includes outer joint part 7 and inner joint part 8 arranged in the cavity of the outer joint part 7. The outer joint part 7 and inner joint part 8 have pairs of opposed ball tracks accommodating torque transmitting balls 9. A plurality of such circumferentially distributed ball track pairs are provided. The balls 9 of all pairs of ball tracks are guided in a cage 10. The inner joint part 8 is provided with a journal 11 which is connected to the connecting shaft, which is in the form of a tubular shaft 4. The connecting shaft 4 includes a corrugated cross-section. Towards the second constant velocity joint 3 a plunging assembly is provided which enables a change in the distance between the two constant velocity joints 2, 3.

To connect the tubular shaft 4 and the journal 11, clamping means are located on the outer face of the tubular shaft 4. The corrugated shape of the tubular shaft 4 is used to provide a non-rotating connection between the tubular shaft 4 and the journal 11. The outer face of the journal 11 is provided with a profile 14 which matches the profile 13 of the tubular shaft. Thus, a plug-in connection is produced which enables the transmission of torque between the journal 11 and the tubular shaft 4. The tubular shaft 4 is secured relative to the journal 11 by clamping means 12.

FIG. 2 shows a cross-section in the region of the plunging means. FIG. 2 shows the corrugated shape of the tube wall 22 of the tubular shaft 4. The shaft circumference alternately includes an outer corrugation peak 17 and an outer corrugation valley 18. This shape continues as far as the tubular shaft 4 region on which the journal 11 is positioned.

FIGS. 3 and 4 illustrate a first embodiment of a connection between the tubular shaft 4 and the journal 11, including clamping means 12. The tubular shaft 4 is corrugated in shape. The shaft wall 22 includes the corrugations as illustrated in FIG. 4. The corrugations include circumferentially distributed raised portions and indentations. As a result, the bore of the tubular shaft 4 has a profile with inwardly directed raised portions 15 and indentations 16. In consequence, a corrugated shape also exists on the outside, including an outer corrugation peak 17 which is followed by an outer corrugation valley 18. An indentation 16 of the profile is positioned in the outer corrugation peak 17. The raised portions 15 and indentations 16 and thus the outer corrugation peaks 17 and the outer corrugation valleys 18 extend parallel to the longitudinal axis 5 of the tubular shaft 4.

The outer face of the journal 11 is provided with a corresponding counter-profile which includes raised portions 19 and indentations 20. The profile 13 and the counter profile 14 overlap by a length of overlap 21. The profile and counter-profile are designed such that a linear contact occurs at the flanks 23 and 24. A gap 25 exists between the inwardly directed raised portion 15 of the profile and the indentation 20 of the counter-profile.

The clamping means 12 includes flange 27 with two flange halves 28, 29 which are divided by plane 30 which contains the longitudinal axis 5. The two flange halves 28, 29 jointly enclose the tubular shaft 4. The flange halves have an inner contour which is substantially adapted to the outer face of the tubular shaft.

The two flange halves 28, 29 include inwardly directed projections 31 whose radially inner faces constitute supporting faces 32. The supporting faces 32 are in contact with the base areas 26 of the corrugation valleys 18. The two flange halves 28, 29 are tensioned relative to one another by bolts 40. Tensioning forces radially directed towards the longitudinal axis 5 are applied to the base areas 26 by means of the supporting faces 32. In consequence, the corrugation peaks 17, located between two corrugation valleys 18, are tensioned such that their flanks are deformed. Thus, an area contact is generated with the flanks 24 of the counter-profile. The tensioning action eliminates any play necessary to easily join the journal 11 and the tubular shaft 4. The connection may be released, for example, to replace the convoluted boots required to seal the joints. It is thus possible to create advantageous maintenance conditions without the need to remove the driveshaft from the vehicle.

Figure 6:
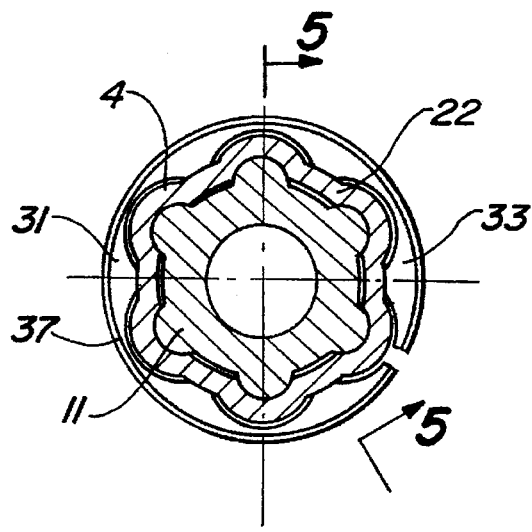
FIG. 6 is a cross-section view referring to FIG. 5 along line 6—6 without showing the tensioning rings.

FIGS. 5 and 6 show an alternative embodiment of a clamping means. FIGS. 5 and 6 illustrate the journal 11 inserted into the tubular shaft 4. A sleeve which constitutes the clamping element 33 is slid onto the outer face of the tubular shaft 4. The sleeve-like clamping element 33 is slotted so that its diameter is reduced when radial tensioning forces are applied.

On its inner face, the clamping element 33 is provided with circumferentially distributed projections. The projections correspond to the outer corrugation valleys of the tubular shaft 4. The projections include supporting faces resting against the base areas in the region of the outer corrugation valleys.

The sleeve-like clamping element 33 has conical tensioning faces 36, 37. The faces 36, 37 start from the sleeve and have a diameter, starting from the end faces, which increases towards the center of the sleeve.

A tensioning ring 34, 35 is positioned on each of the two conical tensioning faces 36, 37. For this purpose, the two tensioning rings 34, 35 include bores 38, 39 corresponding to the tensioning faces 36, 37. The two tensioning rings 34, 35 have corresponding, circumferentially distributed bores to receive bolts 40. The bolts 40 tension the tensioning rings 34, 35 relative to one another, so that the clamping element 33 is contracted by means of the conical tensioning faces 36, 37. As a result, the supporting faces 32 are pressed against the base areas 26 of the outer corrugation valley 18 and deform the wall 22 of the tubular shaft 4 in the region of the corrugation peaks such that the flanks of the profile contact the flanks of the counter-profile. Thus, the tubular shaft 4 and the shaft journal 11 are fixed relative to one another.

Figure 7:
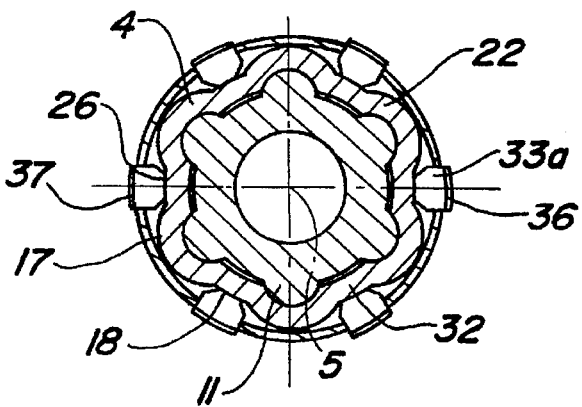
FIG. 7 is a third embodiment of a cross-section view like FIG. 6 of an alternative embodiment with a plurality of clamping elements.

FIG. 7 shows a modified embodiment, including individual tensioning elements 33a. The tensioning elements 33a are separated from one another and are optionally held in a cage, which may be plastics. The tensioning elements 33a have tensioning faces, one of which is visible. The tensioning faces 36, 37 extend like those of the sleeve-like clamping element 33. The tensioning faces of the clamping element 33a also hold tensioning rings with bores. The bores are conical. The tensioning rings are designed like those shown in FIG. 5. The individual clamping elements 33a have supporting faces 32 containing the base areas 26 of the outer corrugation valleys 18.

Figure 9:
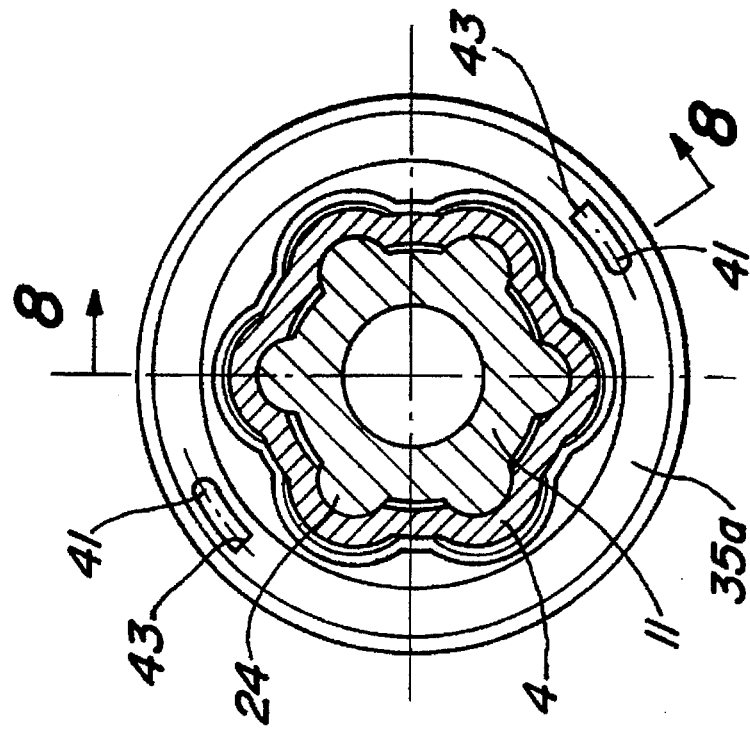
FIG. 9 is a cross-section view along line 9—9 according to FIG. 8.
Figure 8:
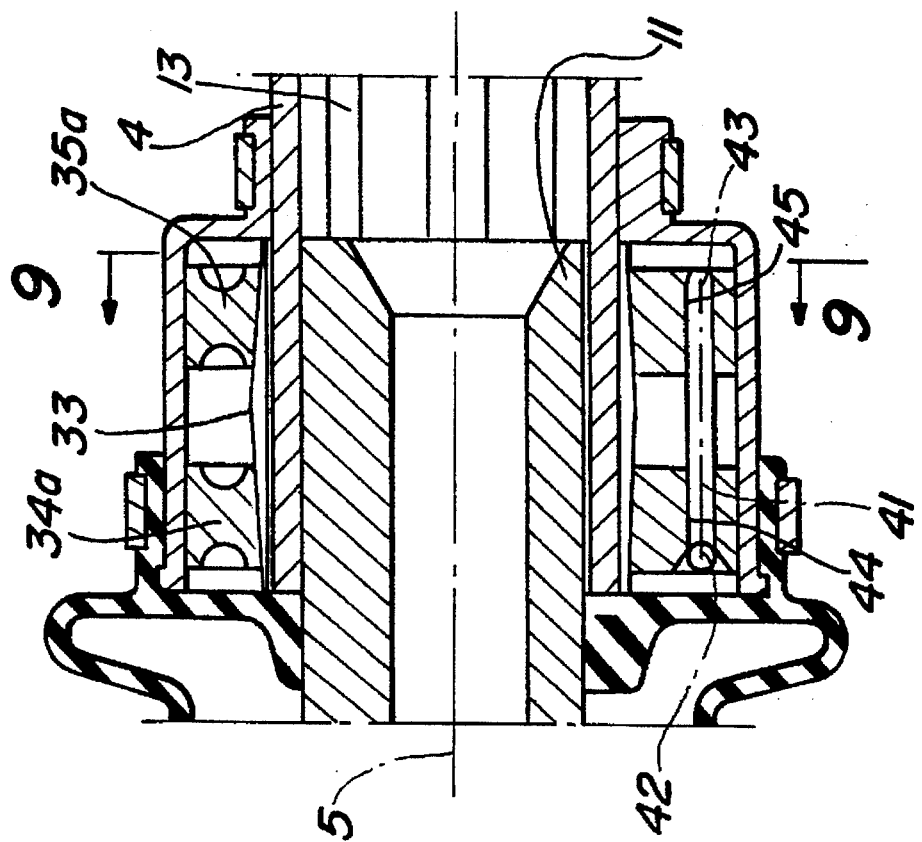
FIG. 8 is a fourth embodiment of a longitudinal section view along line 8—8 of FIG. 9 through a connecting device having a sleeve according to FIG. 5, including tie rods.

FIGS. 8 and 9 show an alternative method of tensioning the tensioning rings according to FIG. 5. Whereas the embodiment according to FIG. 5, for tensioning purposes, includes bolts 40, the embodiment according to FIGS. 8 and 9 uses tie rods 41 for axially tensioning the tensioning rings 34a, 35a relative to one another. The tie rods 41 are made of round steel. The tie rods 41 are associated with the tensioning rings 34a, 35a in a circumferentially distributed way and pass through bores 44, 45 of the tensioning rings 34a, 35a. The bores 44, 45 extend parallel to the longitudinal axis 5. The ends of the tie rods 41 axially project beyond the end faces of the tensioning rings 34a, 35a facing away from one another. After the tensioning rings 34a, 35a have been tensioned, the ends 42, 43 are angled or bent, rest against the end faces of the tensioning rings 34a, 35, which face away from one another, and hold the rings in the tensioned condition. Again, for tensioning purposes, a sleeve is used which constitutes the clamping means 33 and which was described in connection with FIG. 5.

While the above detailed description describes the preferred embodiment of the present invention, the invention is susceptible to modification, variation and alteration without deviating from the scope and fair meaning of the subjoined claims.

We claim:

1. A device for connecting a tubular shaft to a journal, comprising:

a profile in a bore of the tubular shaft which is engaged by the journal, by corresponding counter-profile on the journal outer circumferential face, both profiles having a length of overlap and with the profile and the counter-profile being tensioned relative to one another, and both the profile and counter profile including circumferentially distributed raised portions and indentations which extend parallel to the longitudinal axis and engage one another;

said profile of the tubular shaft is formed by a tube wall of the tubular shaft such that said indentations and raised portions are on both the outer face and inner face of said tubular shaft, said tube wall extends at least along the length of overlap and is provided with a corrugated cross-section;

clamping means for tensioning said tubular shaft relative to the journal, said clamping means having projecting members acting on the indentations of the outer face of the tubular shaft in a region of length of overlap of its said profile relative to the counter-profile.

2. A device according to claim 1, wherein the indentations of the profile of the tubular shaft and the raised portions of the counter-profile of the journal contact one another linearly at their flanks in the untensioned condition.

3. A device according to claim 1, wherein a gap is provided between the raised portions of the profile which are formed by the corrugated shape of the tubular shaft and the indentations of the counter-profile of the journal, said clamping means applying a force to a base area of corrugation valleys which are formed on the outer face of the tubular shaft and which are positioned between adjacent indentations of the profile.

4. A device according to claim 3, wherein said force applied by the clamping means is directed radially onto the longitudinal axis.

5. A device according to claim 3, wherein said clamping means are formed by a flange divided into two flange halves with a dividing plane including the longitudinal axis and with the flange halves being tensioned relative to one another, said flange enclosing the tubular shaft and, the projecting members with supporting faces on an inner contour enclosing the tubular shaft, said projecting members being pressed against the base areas of the corrugation valleys.

6. A device according to claim 3, wherein said clamping means including at least one clamping element with supporting faces resting against the base areas of the outer corrugation valleys of the tubular shaft and tensioning elements, said tensioning elements acting radially inwardly towards the longitudinal axis on the clamping elements.

7. A device according to claim 6, wherein one clamping element is a slotted sleeve with inwardly directed projections provided with said supporting faces, said sleeve positioned on the tubular shaft, said sleeve on an outer face including two conical tensioning faces, said conical tensioning faces extending in opposite directions with respect to one another and a tensioning ring positioned on each said tensioning faces, each tensioning ring having a corresponding conical bore and said tensioning rings being tensioned relative to one another.

8. A device according to claim 7, wherein said tensioning rings are tensioned relative to one another by bolts.

9. A device according to claim 7, wherein said tensioning rings are tensioned relative to one another by tie rods.

10. A device according to claim 9, wherein said tie rods extend axially through bores of the tensioning rings, and are angled at their ends and rest against the tensioning ring faces facing away from one another.

11. A device according to claim 6, wherein including a plurality of clamping elements, each clamping element including a supporting face and arranged in a corrugation valley, said clamping elements, on outer faces, including two conical faces which extend in opposite directions and which complement one another by forming tensioning faces, two tensioning rings with conical bores positioned on said tensioning faces and being tensioned relative to one another.

12. A device according to claim 11, wherein said tensioning rings are tensioned relative to one another by bolts.

13. A device according to claim 11, wherein said tensioning rings are tensioned relative to one another by tie rods.

14. A device according to claim 1, wherein said clamping means acting on flanks of two adjoining raised portions on the outer face of the corrugated tubular shaft, said clamping means apply a clamping force to the raised portions of the counter-profile of the journal.

15. A driveshaft comprising:

two constant velocity joints, each having an outer part and an inner part and a connecting shaft connecting the inner parts and for connecting at least one of the inner parts, a journal connected to said connecting shaft provided in the form of a tubular shaft;

a profile in a bore of the tubular shaft which is engaged by the journal, by corresponding counter-profile on the journal outer circumferential face, both profiles having a length of overlap and with the profile and the counter-profile being tensioned relative to one another, and both the profile and counter profile including circumferentially distributed raised portions and indentations which extend parallel to the longitudinal axis and engage one another;

said profile of the tubular shaft is formed by a tube wall of the tubular shaft such that said indentations and raised portions are on both the outer face and inner face of said tubular shaft, said tube wall extends at least along the length of overlap and is provided with a corrugated cross-section;

clamping means for tensioning said tubular shaft relative to the journal, said clamping means having projecting members acting on the indentations of the outer face of the tubular shaft in a region of length of overlap of its said profile relative to the counter-profile.

* * * * *